United States Patent [19]

Christon et al.

[11] Patent Number: 4,921,002
[45] Date of Patent: May 1, 1990

[54] AUTOMATIC WATERING ZONE SWITCHER

[75] Inventors: Thomas M. Christon; Martin A. Richards, both of Omaha; Eric H. Scholz, Bellevue, all of Nebr.

[73] Assignee: Rain Matic Corporation, Omaha, Nebr.

[21] Appl. No.: 282,241

[22] Filed: Dec. 9, 1988

[51] Int. Cl.⁵ .............................................. F16K 11/22
[52] U.S. Cl. ................................. 137/119; 137/624.18
[58] Field of Search ............... 137/540, 119, 624.18, 137/624.19

[56] References Cited

U.S. PATENT DOCUMENTS

| | | | |
|---|---|---|---|
| 2,219,656 | 10/1940 | Miller | 137/540 X |
| 3,459,208 | 8/1969 | Clyde | 137/119 |
| 3,524,470 | 8/1970 | Kah et al. | 137/119 X |
| 4,085,769 | 4/1978 | van Haaften | 137/119 |
| 4,116,216 | 9/1978 | Rosenberg | 137/624.18 X |
| 4,350,176 | 9/1982 | Lace | 137/540 X |
| 4,530,373 | 7/1985 | Bork et al. | 137/540 X |
| 4,643,217 | 2/1987 | Frentzel | 137/112 |
| 4,729,406 | 3/1988 | Frentzel | 137/119 X |
| 4,796,657 | 1/1989 | Baker | 137/119 |

Primary Examiner—Stephen M. Hepperle
Attorney, Agent, or Firm—Berthold J. Weis

[57] ABSTRACT

A device which switches water flow from an outlet sequentially between two other outlets automatically in response to turning the water supply on and off, by using hydraulic energy of the water, and energy from a spring to manipulate a pair of positions along a predetermined path into positions of appropriately opening and closing the outlets.

16 Claims, 4 Drawing Sheets

AUTOMATIC WATERING ZONE SWITCHER

FIELD OF THE INVENTION

This invention relates to devices for switching the flow of fluid between two or more outlets. More particularly, the invention relates to valves for automatically switching fluid flow from one line outlet to one of two or more device outlets in response to a fluctuation of fluid pressure at the line outlet, especially for residential and agricultural irrigation systems.

BACKGROUND OF THE INVENTION

While the present invention is generally applicable to sequentially distribute fluids from a source which is at least at a modest pressure above ambient over a number of outputs, a principle aim of the invention is for irrigation systems comprised of irrigation lines or circuits intended to feed water to a series of sprinkler heads, drip irrigation outlets and the like. It is generally the case that the available water source pressure limits the total number of irrigation devices which may be supplied by any one circuit. If this limit is exceeded, the devices fed by the circuit generally receive too little water, or water at too low a pressure to properly perform their function. Consequently, it is desirable to lay out irrigation systems comprised of a number of different circuits.

Another rising concern in the design of such systems relates to the prudent management of water. Being able to group the plant materials to be watered according to their water quantity requirements in separate circuits permits far more flexible and economical use of water, by appropriately adjusting the time periods for which the different circuits are supplied with water.

The above advantage or indeed the need of using multiple circuits has been recognized previously. There are available a variety of systems for switching a source of water sequentially between a number of circuits. However, such devices are generally electrically operated valve systems, which are expensive and relatively complicated, usually required to be installed by professionals. Also, owing to the more complicated nature of such systems, their operation, adjustment and maintenance represent more formidable problems.

OBJECTS OF THE INVENTION

Accordingly, a principal object of the present invention is to provide a simple alternative means of connecting a water supply to more than one fluid circuit and permit the source of water to be sequentially switched between these circuits.

Another object of the invention is to provide a switching device which does not require an external, particularly electrical, supply of power, but whose switching action is automatically activated by a drop and rise in the pressure of the supply water, such as by turning the water supply off and on.

Still another object of the invention is to proivde a switching device which is readily compatible with standard faucets and simple automatic on-off valve systems for domestic water supply systems.

Yet another object of the invention is to provide a water diverter device which is rugged, easily cleaned and comprised exclusively of mechanical components with a long service life.

These and other objects will become more clearly apparent upon consideration of the following description.

SUMMARY OF THE INVENTION

In a specific aspect, the invention provides a device for alternately switching water from one outlet to one and then the other outlet of two circuits, each time the water is turned off and on again. This is accomplished by providing a body defining a cylindrical barrel of circular cross-section, each end of which houses a piston capable of axial movement within the barrel in sealed relationship thereto. The water outlet communicates with the barrel volume between the pistons. The openings, which lead into the outlets for the two circuits to be alternately supplied with water, are disposed respectively in the end regions of the barrel housing the pistons. Their precise location is chosen such that the sealing portions of the pistons are able to slide across these openings and thereby alternately establish and prevent fluid communication with the central volume. Water pressure from the outlet powers the travel of the pistons away from the central volume. A pair of springs, one each associated with each piston, are loaded in response to movement of the piston by water pressure, and provide the necessary energy to return the spring toward the center of the barrel. Now, in order to guide the motion of each piston, each piston is provided with projections which engage a circumferential recess in the barrel. The boundaries of the recessed areas are such that the pistons sequentially come to rest in desired axial positions leaving alternately one or the other inlet connected to the central volume. Features of a preferred embodiment include keyed sliding means for locking the circumferential motion of the pistons together. Another feature relates to specific means for draining the central volume of fluid when the outlet pressure is relieved. Still another preferred feature is a recess configuration comprising ratchet like boundaries which provide ramps for incrementally turning the piston in a circumferential direction to bring the projections into axial alignment with slotted guide sections for determining the axial piston position.

More generally, the invention provides a body defining a cylindrical volume, at one end of which is disposed a piston, which is able to move rotationally and axially back and forth. The other end of the cylindrical volume is sealed with respect to flow of fluid, defining a bounded interior volume which is connected to the source of fluid. The piston engages an energy storage device, such as a spring disposed on the side of the piston distal to the interior volume, so that when the interior volume is pressurized by water, the piston moves and the spring is compressed to store energy for moving the piston in the opposite direction. Again, a piston guide means sequentially positions the piston at locations so that fluid conduit means may connect the fluid outlet with unique fluid inlets from the cylindrical volume.

In its most general aspect, the present invention exploits the fluctuation of pressure in the fluid to be switched between a variety of outputs in that the fluid is forced to do work against a suitable energy storage device, such as a spring or air reservoir, for example. The stored energy is then used to incrementally move some suitable conduit means for selectively establishing a fluid path between a fluid source and a particular outlet to a desired fluid dispensing circuit. A conduit means may be a simple piston with one or more circular seals, where fluid communication is established or interrupted by movement of the seals across a given outlet port. However, as used here, the term conduit means is intended to apply to any body with fluid passages, which is able to be moved so that the passages selectively connect a desired output port to the fluid inlet into the switching device. The movement of the means for establishing a selected fluid path is confined to a closed-loop one directional path with discrete stops, each of whic uniquely position the conduit means to establish fluid flow between the fluid source and a desired outlet or set of outlets.

The timing of movement and arresting movement at each stop is controlled by the force of the inlet pressure of the fluid, i.e., the pressure the fluid exerts is sued to counteract the force exerted on the conduit means by the energy storage device, until its motion is arrested at one of the stops, whereas when the fluid pressure is reduced to or below a desired value, the force exerted by the energy storage device, until its motion is arrested at one of the stops, whereas when the fluid pressure is reduced to or below a desired value, the force exerted by the energy storage device will overcome the fluid pressure on the conduit and set it in motion until arrested at another stop. In this fashion, the invention accomplishes switching of fluid supply automatically by simple passive means, in response to the throttling or increasing of fluid flow above or below predetermined values of pressure.

BRIEF DESCRIPTION OF THE DRAWINGS

The invention will be described in greater detail with reference to the drawings, wherein.

DESCRIPTION OF THE PREFERRED EMBODIMENTS

Figure 1:
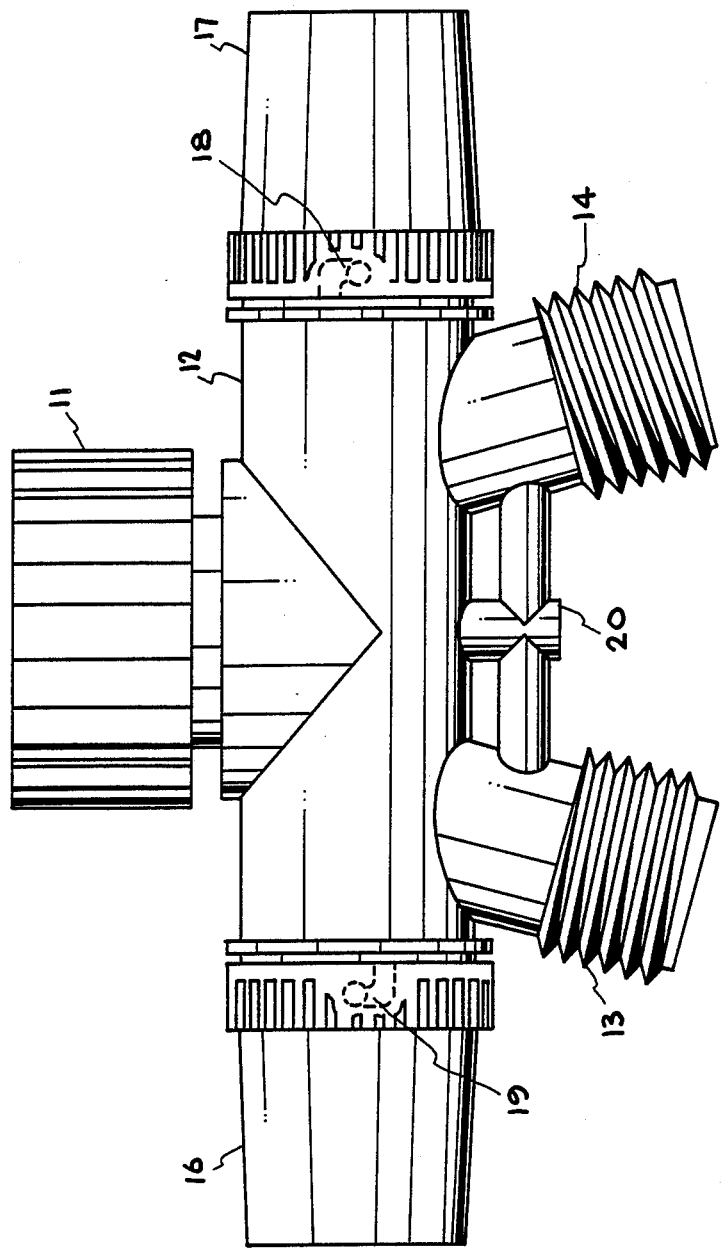
FIG. 1 shows a plan view of a preferred embodiment of the invention, which switches the flow of water from a typical faucet alternately between two outlets.

With reference now to the drawings, FIG. 1 shows a plan, exterior view of the preferred switching device of the present invention. The device is connected to a source of water (not shown) such as a conventional water faucet by means of female screw connector 11 including the appropriate seals. When the water supply is open it feeds water into body 12. The internal switching mechanism, shown and described below with reference to the following figures, alternately routes the water to threaded male connectors 13 and 14 respectively, which serve as outlets to separate circuits using the water (not shown). The interior of body 11 is accessible by removably end caps 16 and 17, secured to body 11 by means of bayonet closures 18 and 19, for positioning the end caps in predetermined circumferential relation to the body for reasons which will become apparent below. The numeral 20 refers to a shuttle check housing, whose function it is to drain the body 11 of water between switching operations.

Figure 2:
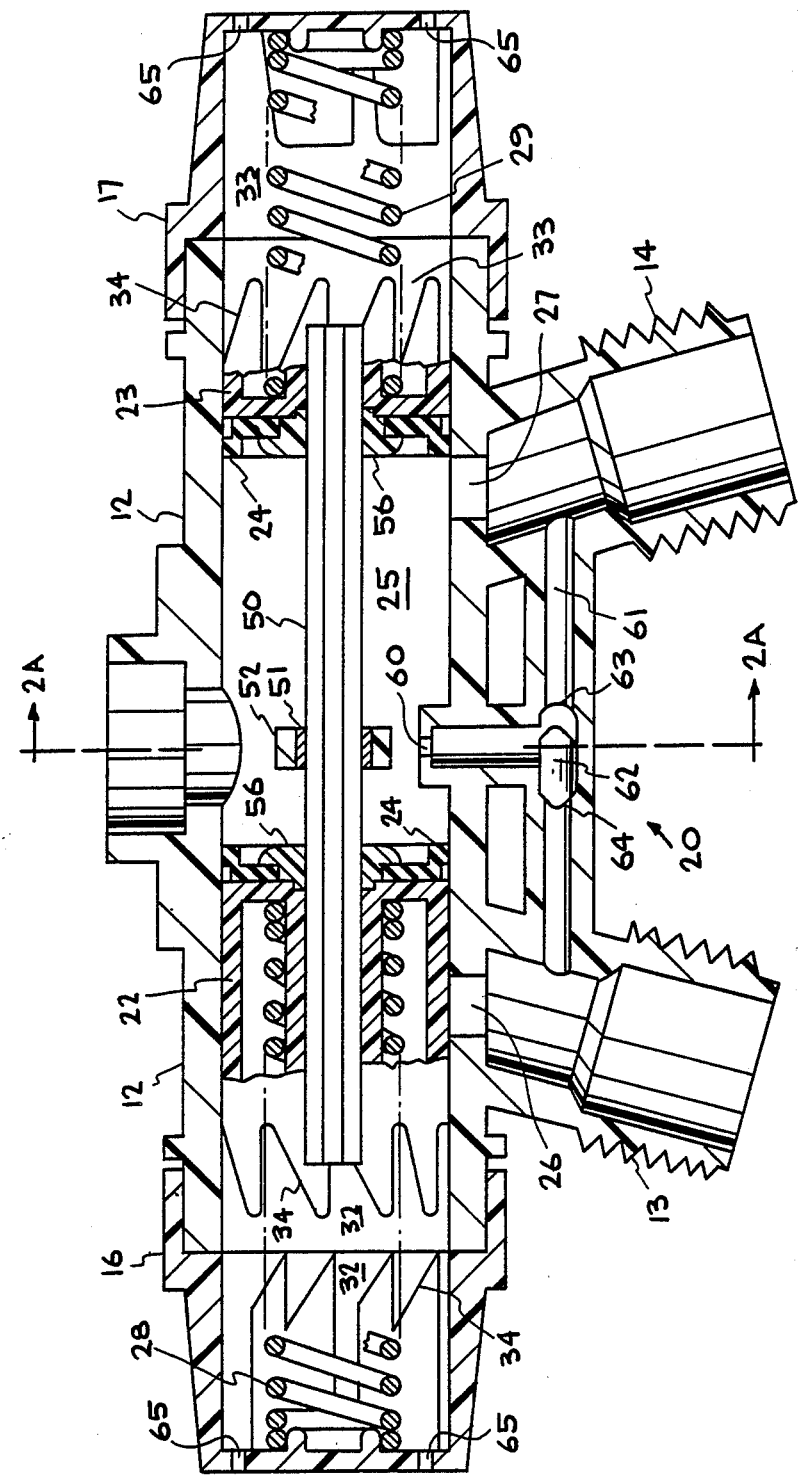
FIG. 2 shows the body of the device shown in FIG. 1, in a cross-sectional view through the longitudinal plane of symmetry.
Figure 2A:
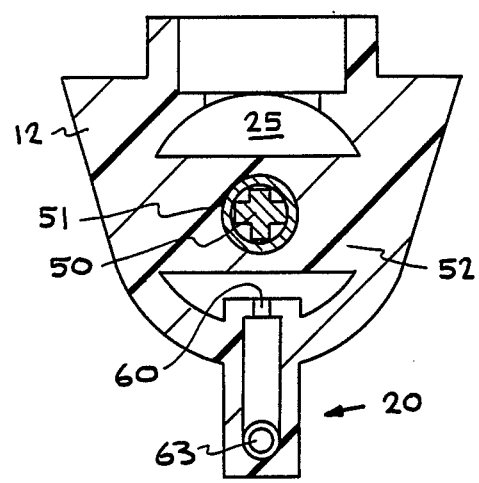
FIG. 2a is a cross-section perpendicular to the plane of symmetry.
Figure 2B:
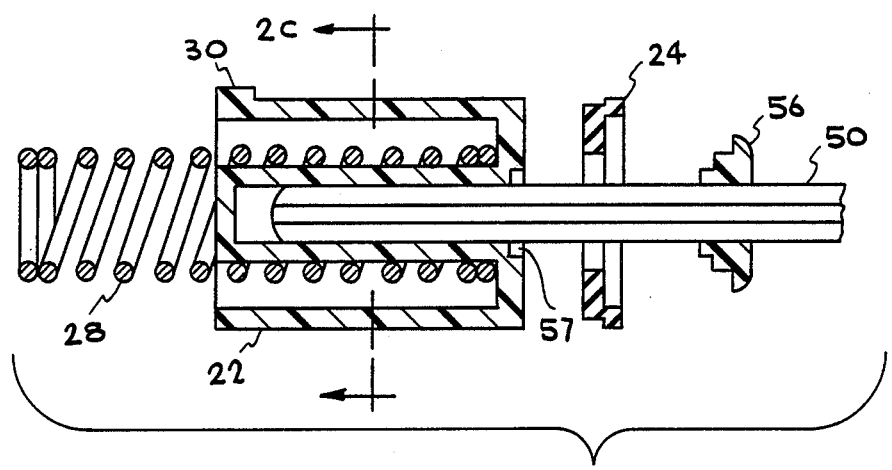
FIG. 2b is a partially exploded cross-sectional view of one side of the internal components of the preferred embodiment.
Figure 2C:
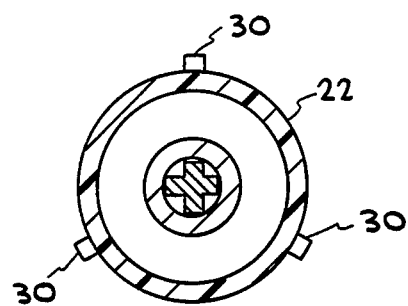
FIG. 2c is a cross-section of the piston element.

FIG. 2 shows the interior of the device. Body 12 defines an interior, transverse cylindrical barrel 21 with a circular cross-section, for slidably housing two pistons 22 and 23, shown only partially for clarity. Each piston is provided a seal 24, which prevents water from flowing from the central volume 25 past the pistons into the regions within the end caps 16 and 17. In operation, the pistons slide over openings 26 and 27, alternately opening and closing the fluid path through these openings into outlets 13 and 14. When water is admitted into central volume 25, its pressure causes the pistons 22 and 23 to move towards the end caps 16 and 17, compressing springs 28 and 29 in the process. The axial movement of the piston continues, until projections 30, shown more clearly in FIGS. 2b and 2c encounter the outer boundaries of recesses 32 and 33.

When the water is turned off, the pressure in the central volume 25 will drop and the force of the springs 28 and 29 will eventually overcome the force of the water and move the pistons toward the center. Again, the movement of the pistons continues until stopped at the inner boundaries of recesses 32 and 33.

Figure 3:
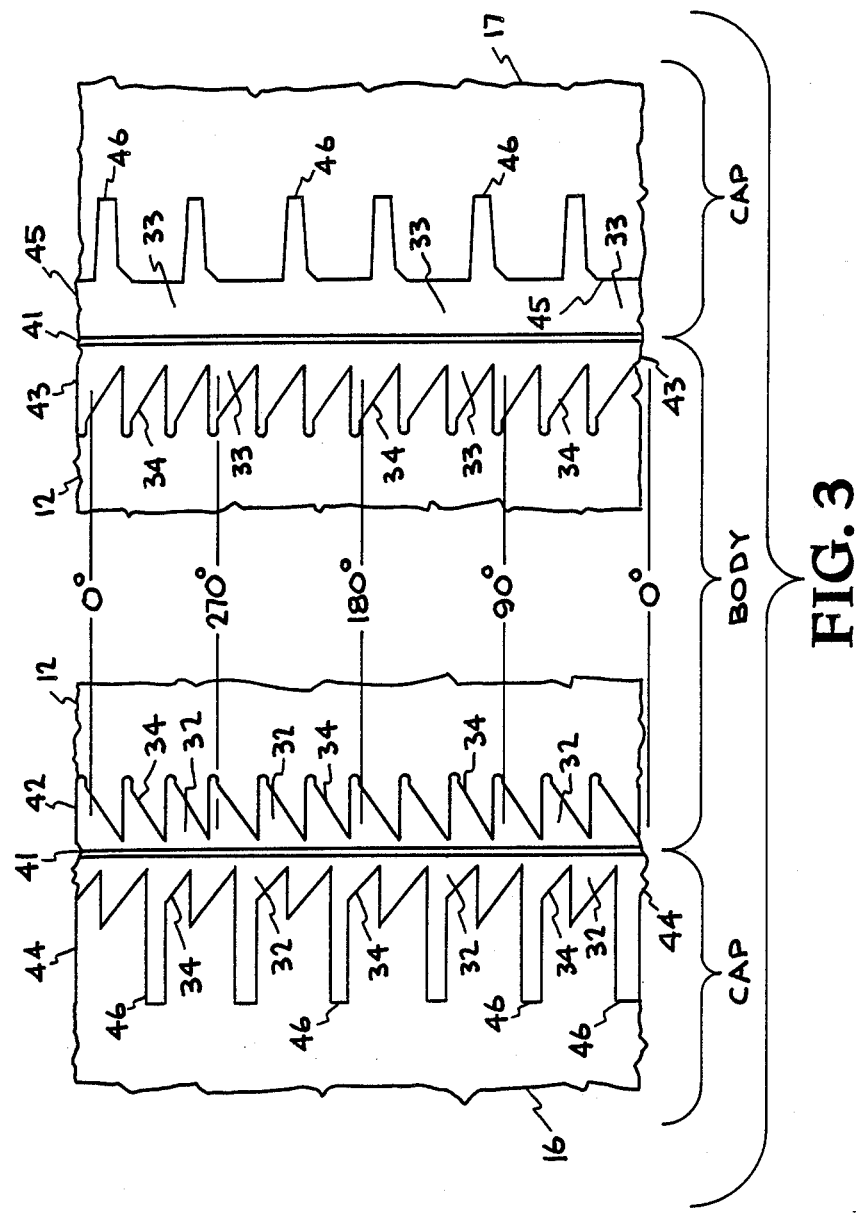
FIG. 3 is a planar diagram of the circumferentially recessed and raised lands which guide and limit the rotational and axial travel of the pistons.

The layout of the recessed portions of the interior surfaces of the barrel and the end caps are more clearly shown in FIG. 3, representing a planar map of the interior cylindrical surface. It should be noted that recess 32 is partly an area of reduced thickness within end cap 16, and partly an area of reduced thickness of body 12, likewise at the other end. The joints 41 between end caps and body are rounded at the edges to prevent the stops from catching. At zero water pressure in the central volume of the barrel 12, the springs will have moved the pistons to their maximum possible central position, i.e., with the piston protrusions resting against the inner boundaries 42 and 43 of the recesses. On the other hand, when the water pressure in the interior volume is at its maximum, the protrusions will be resting against the outer boundaries 44 and 45 of the recesses. When water pressure is relieved or turned on, the pistons will travel generally in an axial direction.

The boundaries of the recessed area include ramped sections 34 where the boundary is generally at an angle to the axis of the barrel. The purpose of these sections is to rotate the piston circumferentially in order to bring protrusions 30 eventually into axial alignment with the elongated slots 46, which permit a piston to move past openings 26 or 27, thereby opening the particular outlet. Since the elongated slots 46 at one end are offset with respect to the slots at the other end, one and only one of the openings 26 or 27 is opened, and their respective opening alternates. It is hence possible to determine the opening time interval of each circuit by controlling the time at which the main water source opened and closed.

In a preferred embodiment of the invention the rotational motion of the two pistons is coupled together. This is readily achieved in providing elongated bar 50 having a cruciform cross-section which permits the piston to axially slide along the bar but not rotate with respect to it. Bar 50 is rotatably mounted to body 12 by means of a bushing 51 disposed in a central aperture in cross piece 52 which is an integral part of the body. An important feature of a preferred variation of the present device, shown in the figures, utilizes piston 22 as the driving piston and piston 23 as the driven piston, with their circumferential motion locked together by bar 50.

Spring 28 may be somewhat stronger than spring 29, and the elongated slots 46 which permit piston 23 to open outlet 27, are axially aligned with a ramped section 34 on the driving side. Consequently, the driving piston 22 will essentially twist the driven piston 23 into alignment with one of slots 46 and the water pressure will snap the piston into place. Advantages of this arrangement are that the margin of error or chance for the piston to misengage and hence fail to operate properly is significantly reduced, compared to arrangements where the pistons are able to rotate independently.

The preferred arrangement of securing seals 24 to the pistons utilizes plug-type fastener 56, which firmly engages recess 57 of the piston, such as by being press fit into a recess in the piston which, however, permits the seal to freely rotate. The purpose of this arrangement is to prevent friction between the seal and the barrel to impede the rotational motion of the pistons.

A further feature of the invention relates to drain mechanism 20. Since fluids are incompressible, it is necessary to provide for removal of fluid from the central volume 25 in order to permit the springs to fully return the pistons to their central position, particularly if the device is sealed tightly. The preferred mechanism is shown in detail in FIGS. 2 and 2a. Passage 60 leads from the central volume 25 into tubuular channel 61 which connects to outlets 13 and 14. Shuttle check valve 62 is able to reciprocally slide and seat against valve seats 63 and 64 in response to water pressure in one o the outlets. When the water is turned off, the valve remains open to permit volume 25 to drain.

Similarly, it is preferred to vent the end caps. Apertures 65 in the end caps serve this purpose simply by venting the end caps to the atmosphere, thereby preventing undue additional resistance against axial motion of the pistons. An alternate version utilizies end caps without vents. To guard against accumulation of leaked water, these end caps are provided with drain passages into central volume 25 of the adjacent outlet.

The above description of the preferred embodiment dealt principally with a device having two pistons each with one simple seal for switching water between two output apertures. However, it should be particularly realized that the concepts of this invention could be employed to positino single pistons with multiple seals and fluid passages through the piston to establish fluid communication between the inlet and a desired unique outlet. In particular, motion of the piston is brought about by either fluid pressure or stored energy derived from the fluid, and controlled by means of lands defining a pathway or the piston with stops which uniquely position the piston to open a particular pathway.

It is, of course, also contemplated to use the preferred embodiment in a tree configuration, where the outlets of a first device are connected to the inlet of additional devices to permit fluid switching between more than two circuits.

Finally, the device is particularly suited for use in combination with simple timers for turning water on and off.

Having thus described our invention, it will be appreciated that numerous modifications may be made without departing from the spirit of the invention, whose scope should therefore be limited only by the following claims.

What is claimed is:

1. A device for mechanically, automatically, and sequentially switching the flow of fluid from a pressurized source between two fluid outlets, which comprises:
    a body defining an interior cylindrical barrel having a circular cross-section;
    first piston means disposed in said barrel towards one end thereof, said piston means being capable of rotational and axial motion within said barrel in response to axial force exerted on said piston means;
    second piston means, disposed in said barrel toward the other end thereof at a position distal with respect to said first piston means to define an enclosed cylindrical volume within said barrel between said piston means, said second piston means also being capable of rotational and axial motion within said barrel in response to axial force exerted on said piston;
    first conduit means capable of connecting said device to said pressurized source of fluid, said conduit means establishing fluid communication with said cylindrical volume within said barrel between said pistons;
    first and second output conduits, establishing fluid communication with the interior of said barrel, respectively, in the regions of said barrel capable of being traversed by said first and second piston means;
    energy storage means coupled to said first and second piston means, for extracting energy from said pressurized source of fluid and releasing said energy to move said piston means toward said central volume, whereby said piston means may be forced apart when said source of pressurized fluid is turned on to exert pressure against said pistons, and forced together when said source of pressurized fluid is turned off by release of stored energy from said energy storage means coupled to said piston; and
    guide means for alternately permitting one of said pistons to open one of said output conduits to selectively establish fluid communication between said output conduit and said central volume.

2. The device of claim 1, further comprising means for sealing said barrel against flow of fluid past said pistons associated with said first and second piston means.

3. The device of claim 2, wherein said means for sealing comprise circular seals fixed to said piston means in sealing relation to the interior surface of said barrel.

4. The device of claim 3, wherein said means for sealing are free to rotae with respect to said piston means.

5. The device of claim 1, further defined in that it comprises end caps removably fixed to said body to cover the ends of said barrel, and in that said energy storage means comprises a pair of springs disposed to axially extend between said end caps and said piston means.

6. The device of claim 5, wherein said end caps are apertured to vent the space between said end caps, said body, and said piston means.

7. The device of claim 5, including fluid passages whereby the space bounded by said end caps, said body and said piston means is in fluid communication with said outlet means.

8. The device of claim 1, comprising means for draining said central volume when said pressurized source is turned off.

9. The device of claim 8, wherein said means for draining said central volume comprises secondary fluid channels between said central volume and said outlets and valve means responsive to fluid pressure in said outlets to open said second fluid channel to permit draining said central volume.

10. The device of claim 5, wherein said guide means for alternately permitting one of said pistons to open one of said output conduits comprises a partially recessed surface in the cylindrical surface of said barrel and means connected to said piston constrained to move within the boundaries of said recessed surface.

11. The device of claim 10, wherein said end caps include cylindrical interior surfaces and said partially recessed surface extends into the cylindrical interior surface of said end caps.

12. The device of claim 11, wherein said boundary of said recessed surface includes ratchet-like sections for rotating the pistons within said barrel.

13. The device of claim 12, wherein the boundaries of said recessed surfaces include sections of maximal axial distance from the center of said interior volume for positioning said pistons to alternately open said outlet conduits.

14. The device of claim 13, wherein said sections of maximal distance are uniformly distributed over the circumference of said recessed surfaces, and said ratchet-like sections are distributed between said sections of maximal distance to rotationally advance and guide said piston means into the positions defined by said sections of maximal distance from the center of said volume; and
wherein between said sections of maximal distance said boundaries define sections of a lesser distance from the center of said volume corresponding to positions of the piston means wherein said outlet conduit is sealed from said central volume, and wherein said sections of maximal distance from said center in a recess associated with one piston means are circumferentially offset with respect to the sections of maximal distance in the other recessed surface, whereby each piston alternately occupies a position associated with said section of maximal distance and alternately opens said output conduit associated with said piston.

15. The device of claim 14, wherein includes means for coupling the rotational motion of the two pistons, and wherein one of said springs is stronger compared to the other, and wherein the boundary of the recessed surface which governs the motion of the piston means associated with the other spring exhibits an outline resembling a square wave having sections of maximal distance from the center of the interior volume of the barrel, said sections of maximal distance being circumferentially aligned with ratchet-like sections of the boundary of the other recessed surface, whereby the stronger spring, the piston means associated with the stronger spring, and said ratchet-like section of the boundary cooperate to urge said other piston means into a position to open the output conduit associated therewith.

16. The device of claim 1, in combination with valve means for automatically turning said pressurized source of fluid on and off.

* * * * *